United States Patent
Chu et al.

(10) Patent No.: US 9,968,892 B2
(45) Date of Patent: May 15, 2018

(54) FUNCTIONALIZATION OF NANOFIBROUS MICROFILTRATION MEMBRANES FOR WATER PURIFICATION

(75) Inventors: Benjamin Chu, Setauket, NY (US); Benjamin S. Hsiao, Setauket, NY (US); HongYang Ma, East Setauket, NY (US)

(73) Assignee: NATIONAL SCIENCE FOUNDATION, Arlington, VA (US)

( * ) Notice: Subject to any disclaimer, the term of this patent is extended or adjusted under 35 U.S.C. 154(b) by 1349 days.

(21) Appl. No.: 14/362,028

(22) PCT Filed: Jan. 4, 2012

(86) PCT No.: PCT/US2012/020206
§ 371 (c)(1),
(2), (4) Date: Oct. 13, 2015

(87) PCT Pub. No.: WO2012/094407
PCT Pub. Date: Jul. 12, 2012

(65) Prior Publication Data
US 2016/0184778 A1    Jun. 30, 2016

Related U.S. Application Data
(60) Provisional application No. 61/429,603, filed on Jan. 4, 2011.

(51) Int. Cl.
*B01D 71/60* (2006.01)
*B01D 67/00* (2006.01)
(Continued)

(52) U.S. Cl.
CPC ......... *B01D 71/60* (2013.01); *B01D 67/0004* (2013.01); *B01D 67/0006* (2013.01);
(Continued)

(58) Field of Classification Search
CPC .... B01D 71/60; B01D 67/0004; B01D 69/02; B01D 69/125; B01D 69/12;
(Continued)

(56) References Cited

U.S. PATENT DOCUMENTS

| 4,814,082 A | 3/1989 | Wrasidlo |
| 5,085,780 A | 2/1992 | Ostreicher |

(Continued)

FOREIGN PATENT DOCUMENTS

| JP | 61209003 | 9/1986 |
| WO | 9518665 | 7/1995 |

(Continued)

OTHER PUBLICATIONS

Ma et al., "Immobilization of Cibacron Blue F3GA on Electrospun Polysulphone Ultra-Fine Fiber Surfaces Towards Developing an Affinity Membrane for Albumin Adsorption", Journal of Membrane Science, vol. 282, pp. 237-244; 2006.

*Primary Examiner* — Taiwo Oladapo
(74) *Attorney, Agent, or Firm* — Hoffmann & Baron, LLP (57) ABSTRACT

A high flux and low pressure drop microfiltration (MF) membrane and a method for making the MF membrane. The microfiltration membranes are formed by a method that includes: preparing a nanofibrous structure; and modifying the surface of the nanofibrous structure with a surface modifier. The nanofibrous structure includes an electrospun nanofibrous scaffold or a polysaccharide nanofiber infused nanoscaffold or mixtures thereof. The electrospun nanofibrous scaffold can include polyacrylonitrile (PAN) or polyethersulfone (PES))/polyethylene terephthalate (PET) or mixtures thereof. The surface modifier includes polyethylenimine (PEI) and polyvinyl amine (Lupamin) crosslinked by ethylene glycol diglycidyl ether (EGdGE)/glycidyltrimethylammonium chloride (GTMACl) or poly(1-(1-
(Continued)

(a)

(b)

1.0 μm

SEM images of PAN electrospun nanofibers before being coated (a) and after being coated with poly(VEVIMIBr) (b)

vinylimidazolium)ethyl-3-vinylimdazolium dibromide (VEVIMIBr).

12 Claims, 9 Drawing Sheets

(51) Int. Cl.
| | |
|---|---|
| *B01D 69/10* | (2006.01) |
| *B01D 71/42* | (2006.01) |
| *B01D 71/48* | (2006.01) |
| *B01D 71/68* | (2006.01) |
| *D04H 1/728* | (2012.01) |
| *B01D 69/12* | (2006.01) |
| *B29C 37/00* | (2006.01) |
| *B29C 47/00* | (2006.01) |
| *D01D 5/00* | (2006.01) |
| *D01F 6/18* | (2006.01) |
| *D01F 11/06* | (2006.01) |
| *B01D 69/02* | (2006.01) |
| *B01D 61/14* | (2006.01) |
| *B29K 33/20* | (2006.01) |
| *B29L 31/14* | (2006.01) |

(52) U.S. Cl.
CPC ............ *B01D 69/02* (2013.01); *B01D 69/10* (2013.01); *B01D 69/12* (2013.01); *B01D 69/125* (2013.01); *B01D 71/42* (2013.01); *B01D 71/48* (2013.01); *B01D 71/68* (2013.01); *B29C 37/0025* (2013.01); *B29C 47/0014* (2013.01); *B29C 47/0076* (2013.01); *D01D 5/0007* (2013.01); *D01F 6/18* (2013.01); *D01F 11/06* (2013.01); *D04H 1/728* (2013.01); *B01D 61/147* (2013.01); *B01D 2323/30* (2013.01); *B01D 2323/39* (2013.01); *B01D 2325/20* (2013.01); *B29K 2033/20* (2013.01); *B29L 2031/14* (2013.01)

(58) Field of Classification Search
CPC .... B01D 67/0006; B01D 69/10; B01D 71/68; B01D 71/48; B01D 71/42; B01D 2325/20; B01D 2323/39; B01D 61/147; B01D 2323/30; B29C 47/0014; B29C 47/0076; B29C 37/0025; B29K 2033/20; B29L 2031/14; D01D 5/0007; D01F 11/06; D01F 6/18; D04H 1/728
See application file for complete search history.

(56) References Cited

U.S. PATENT DOCUMENTS

| | | | |
|---|---|---|---|
| 6,565,749 B1 | 5/2003 | Hou et al. | |
| 6,790,455 B2 | 9/2004 | Chu et al. | |
| 2002/0155225 A1 | 10/2002 | Yeh et al. | |
| 2004/0251193 A1* | 12/2004 | Wu | B01D 15/363 |
| | | | 210/321.86 |
| 2005/0214803 A1 | 9/2005 | Wang | |
| 2008/0149561 A1* | 6/2008 | Chu | A61L 15/425 |
| | | | 210/500.38 |
| 2010/0323573 A1 | 12/2010 | Chu et al. | |

FOREIGN PATENT DOCUMENTS

| | | |
|---|---|---|
| WO | 0037385 A1 | 6/2000 |
| WO | WO2000050161 A1 * | 8/2000 |
| WO | 0107090 A1 | 2/2001 |
| WO | 2007001405 A2 | 1/2007 |
| WO | 2012094407 A1 | 7/2012 |

\* cited by examiner

Figures 1 (a) and (b)
SEM images of PAN electrospun nanofibers before being coated (a)
and after being coated with poly(VEVIMIBr) (b)

Figure 2
TGA curves of PAN electrospun membranes, poly(EOTMTA)/PAN,
and poly(VEVIMIBr)/PAN microfiltration membranes.

Figure 3

DSC curves of PAN electrospun membranes, poly(EOTMTA)/PAN, and poly(VEVIMIBr)/PAN microfiltration membranes.

Figure 4

Mechanical properties of PAN electrospun, poly(EOTMTA)/PAN, and poly(VEVIMIBr)/PAN nanofibrous membranes.

Figure 5
Pore size distributions of PAN electrospun, poly(EOTMTA)/PAN, and poly(VEVIMIBr)/PAN nanofibrous membranes.

Figure 6 (a)
BSA adsorption capacities of poly(VEVIMIBr)/PAN nanofibrous membrane and GS0.22

Figure 6 (b)
Langmuir adsorption isotherm of poly(VEVIMIBr)/PAN nanofibrous membrane and GS0.22.

Figure 7
Adsorption capacity of PEI/PAN/AWA and Cuno for metanil yellow

Figure 8
Adsorption capacity of PEI/PAN/AWA at different pre-washing time

Figure 9

Adsorption capacity of PEI/PAN/AWA at different pre-washing times

Figure 10

Adsorption capacity of PEI/PAN/AWA with two different filtration disc sizes

Figure 11
Maximum adsorption capacity of PEI/PAN/AWA

Figure 12
Adsorption capacity of PEI/PET membranes

Figure 13
Adsorption capacity of PEI/PAN/PET membrane and Cuno filter at pH 9

Figure 14
Adsorption capacity of (EGGE/GMACl/PEI)/PAN/PET membrane at pH 9

Figure 15
Adsorption capacity of (EGGE/GMACl/PEI)/PAN/PET membrane at different pH values

FUNCTIONALIZATION OF NANOFIBROUS MICROFILTRATION MEMBRANES FOR WATER PURIFICATION

This application claims priority from provisional application Ser. No. 61/429,603 filed on Jan. 4, 2011, which is incorporated herein in its entirety.

This invention was made with Government support under Grant No. DMR-1019370 awarded by the National Science Foundation and Grant No. N000140310932 awarded by the Office of Naval Research. The Government has certain rights in the invention.

FIELD OF THE INVENTION

The present invention is a high flux and low pressure drop microfiltration (MF) membrane used for water purification. In particular, the present invention relates to microfiltration membranes formed by electrospinning.

BACKGROUND OF INVENTION

Electrospinning technology has been developed rapidly in the last decade. The fabricated submicron-size diameter fibers formed from natural and synthetic polymers have been applied widely to different research areas and industries, such as tissue engineering, drug delivery, sensors and electrodes for use in electronics, gas storage, and air purification. During the electrospinning process, when the applied voltage is strong enough to overcome the surface tension of the (charged) polymer solution at the tip of the spinneret, a fine jet stream is ejected. As this jet stream travels from the spinneret to the collector, the solvent in the jet stream is evaporated while the polymer solution begins to form a thinner and thinner jet stream, resulting in the formation of a non-woven fibrous scaffold at the collector. The fiber diameter and the morphology are affected by both processing and materials parameters. A relatively new utilization of the electrospun nanofibrous scaffolds is their application in water purification.

Electrospun membranes have a high porosity (>80%) with fine diameters (from about 0.1 μm to about 1 μm) and an interconnected-pore structure, which yields a relatively very high specific surface area. As a typical demonstration, electrospun nanoscaffolds were used as a supporting layer in the thin-film nanofibrous composite (TFNC) ultra- and nano-filtration membranes, with the demonstrated permeation flux increased by a factor of from about 2 to about 10 when compared with typical commercial membranes. Another representative application of electrospun scaffolds (self supported or supported with a non-woven substrate, e.g., polyethylene terephthalate (PET)) that has been demonstrated in water purification applications is the use of such a microfilter for removal of nanoparticles which can be regarded as a model for waterborne bacteria, e.g., E. coli and B. diminuta, in drinking water. The pore size and pore size distribution of electrospun polyvinylidene fluoride (PVDF), polyacrylonitrile (PAN), polysulfone (PSU), polyvinyl alcohol (PVA), and regenerated cellulose scaffolds have been investigated. For the removal of bacteria in contaminated drinking water, the pore size and pore size distribution of the electrospun membrane have to be improved in order to remove bacteria by size exclusion.

Typically, the diameter of waterborne bacteria is larger than about 0.2 μm. For instance, the dimension of B. diminuta is 0.3 μm×0.9 μm and that of E. coli is 0.5 μm×2.0 μm. Then, it becomes essential that the average pore size of the electrospun membrane should be less than 0.2 μm. Moreover, the pore size distribution must be relatively narrow in order to achieve a high retention value for bacteria (e.g., a 6 log reduction value—"LRV"). The average pose size of the electrospun membrane can be related to the average filter diameter at constant porosity. To approach a 0.3 μm average pore size, the average fiber diameter of the electrospun mat should be less than the 100 nm range. The nanofibrous composite membranes of electrospun PVA and PAN on PET support could approach this goal.

Another concern is that the surface of electrospun nanoscaffolds has to be functionalized so as to adsorb small viruses (or metal ions) which are not being removed by size exclusion but by adsorption (or complex formation). Typical modification methods include chemically grafting charged groups or ligands where many reaction steps would be involved, or by physical absorption of active groups where the attachments are often not durable. An alternative is the incorporation of functional additives into the electrospinning polymer solution; however, all electrospinning parameters would then be affected. Thus, the modifications require specific pathways for different types of functionalizations.

There are representative patents, e.g., U.S. Pat. No. 5,085,780 to Ostreicher, (Cuno, Inc., issued Feb. 4, 1992), WO 00/37385 to Wei (Kimberly-Clark Worldwide Inc., published Jun. 29, 2000), U.S. Patent Publication No. 2002/0155225 to Yeh et al. (Cummings & Lockwood, published Oct. 24, 2002), and U.S. Pat. No. 6,565,749 to Hou et al. (The Procter & Gamble Company, issued May 20, 2003), that have provided a facile method in employing charges on fibrous filters (e.g., glass fibers) by surface coating with positively charged polymers (e.g., polyamino-polyamide, polyethylenimine (PEI)) and followed by cross-linking with epichlorohydrin or multi-epoxy groups. All of the patents and patent publications cited in this paragraph are incorporated herein in their entirety.

In U.S. Pat. No. 5,085,780 to Ostreicher, cellulose fibers/silica-based particulates/fiber-filter elements were used as the substrate, whereby the surface of the fibers was coated with polyamino-amine-epichlorohydrin/polyamine-epichlorohydrin resin as the primary layer. In order to improve the capacity of the filter, a secondary amine (e.g., ethylenediamine) was also used for further modification. The filters were then challenge tested with Metanil yellow (4 ppm), 0.1 μm latex particle suspension, and Pyrogen aqueous solution (with the pH ranging from 7 to 12) for the adsorption process.

WO 00/37385 to Wei uses similar modifications but based on glass fibers/cellulose fibers as the support. Moreover, acrylic resin binder was used in the polyamino-amine-epichlorohydrin/polyamine-epichlorohydrin resin system.

U.S. Patent Pub. No. 2002/0155225 to Yeh et al. modified polyester (e.g., polyethylene terephthalate (PET)) by hydrolyzed with NaOH or aminolyzed with $NH_3$ (aq.) as the substrate. After hydrolyzation, a carboxylate group/amide group was produced that further reacted with epoxy-ammonium reagents. After modification, the ammonium group was introduced on the surface of the polyester filter which provided the adsorption capacity of Metanil yellow (10 ppm) at pH 9. However, only static adsorption experiments were performed in this patent.

U.S. Pat. No. 6,565,749 to Hou et al. employed mainly different grades of glass fibers from Ahlstrom Corporation, Helsinki Finland, as the substrate and modified polymers containing quaternary ammonium units, PEI cross-linked with diglycidylether of 1,4-butanediol, and polyamide prepared by condensation of poly(methyl bis(3-amino propylamine)) with dicarboxylic acid. The adsorption capacity of those filters was comprehensively challenge tested with both bacteria (including *Klebsiella terrigena, E. coli*, and *B. diminuta*) and a bacteriaphage MS2. The filter could withstand up to 5000 mL of bacteria or viruses (concentration from about $10^6$ to about $10^8$ pfu/mL) suspension before failure and up to 1000 mL of the suspension before LRV of the filter started to decrease.

Microfiltration membranes have been used in various applications including cell storage and delivery systems as disclosed in U.S. Pat. No. 6,790,455 to Chu et al., which is incorporated herein in its entirety.

Extending the usage life of microfiltration filters is a major challenge faced by all commercial microfiltration membranes. Polyethylenimine (PEI) has been shown to be an effective adsorbant for viruses. However, without effective immobilization, it can be washed out quickly. A PAN/PET filter (e.g., AWA-16-1; referred to hereinafter as "AWA" is available from Sanko Ltd. Co., Japan) modified with PEI can have 4 log reduction value (LRV) against bacteriaphage MS2 but only for short time periods. PEI can be stabilized in PAN/AWA by cross-linking. The di-epoxy group is a good candidate to cross-link PEI with a high degree of cross-linking and controlled reaction rate. In addition, glutaraldehyde (GA) is another option for the cross-linking reaction, where a high flux, high retention, and long life (high capacity) nanofibrous microfiltration filter can be achieved for water purification applications.

SUMMARY OF THE INVENTION

In accordance with the present invention, a high flux and low pressure drop microfiltration (MF) membrane and a method for making the MF membrane are provided. The high flux and low pressure drop microfiltration membranes are formed by a method that includes: preparing a nanofibrous structure; and modifying the surface of the nanofibrous structure with a surface modifier. The nanofibrous structure includes an electrospun nanofibrous scaffold or mixtures thereof. The electrospun nanofibrous scaffold can include polyacrylonitrile (PAN) or polyethersulfone (PES))/polyethylene terephthalate (PET) or mixtures thereof. The microfiber scaffold can include glass fibers or other fibers with diameters in the micron or tens of micron size range or a mixture thereof. The nanofibrous structure includes nanofibers having diameters of from about 50 to about 500 nm and preferably from about 100 to about 400 nm.

The surface modifier includes polyethylenimine (PEI) and polyvinyl amine cross-linked by glutaraldehyde (GA) or ethylene glycol diglycidyl ether (EGdGE)/glycidyltrimethylammonium chloride (GTMACl) or poly(1-(1-vinylimidazolium)ethyl-3-vinylimdazolium dibromide (poly(VEVIMIBr)). Preferably, the surface modifier is produced by in-situ polymerization and forms a coating on the nanofibrous structure. Preferably, the coating has a thickness of from about 5 to 30 nm and more preferably from about 10 to 20 nm.

BRIEF DESCRIPTION OF THE FIGURES

The preferred embodiments of the high flux and low pressure drop microfiltration membrane of the present invention, as well as other objects, features and advantages of this invention, will be apparent from the accompanying drawings wherein.

DETAILED DESCRIPTION OF THE INVENTION

The present invention relates to high flux, high retention, and long life (high capacity) nanofibrous microfiltration filters fabricated by surface modifications of electrospun nanofibrous scaffolds (e.g., polyacrylonitrile (PAN) and polyethersulfone (PES))/polyethylene terephthalate (PET)) and microfiber scaffolds (e.g., glass fibers) and their mixtures with polyethylenimine (PEI)/glycidyltrimethylammonium chloride (GTMACl), cross-linked by ethylene glycol diglycidyl ether (EGdGE) PEI/glycidyltrimethylammonium chloride (GTMACl) cross-linked by glutaraldehyde (GA), or polyvinyl amine cross-linked by EDdGE, or polyvinyl amine cross-linked by GA, or poly(1-(1-vinylimidazolium)ethyl-3-vinylimdazolium dibromide (VEVIMIBr), as produced by in-situ polymerization.

The filter has long-term retention for viruses (e.g., a bacteriophage MS2), anionic dye (e.g., Metanil yellow), and metal ions (e.g., chromate ion, lead ion, mercury ion) when compared with current commercial microfiltration filters (e.g., CUNO® filter and AHLSTROM® filter). It has been found that high retentions of MS2 (>5.2 log reduction value (LRV)) with the initial concentration of $10^6$ plaque-forming unit (pfu)/mL) could be simultaneously achieved using such composite filters up to 40 min at 9 mL/min (with 47 mm discs). The commercial CUNO® membrane achieved 4.8

LRV at beginning and failed quickly. The term "log reduction value" or LRV as used herein with respect to the microfiltration membranes, is the logarithm to the base 10 of the ratio of the concentration of the organisms or particulates in the feed to the concentration of the organisms or particulates in the filtrate, i.e., LRV=log($C_{feed}$)–log($C_{filtrate}$).

The high retention and long life of the filters of the present invention were also observed from the adsorption of Metanil yellow (10 ppm aqueous solution). The high retention of anionic dye (>99%) could be maintained up to 90 min at 10 mL/min (47 mm disc). Also, high retention and usage of the filters were also observed even at a pH of 9, where most commercial membranes should have failed at an early stage. The pressure drops of the filters are also lower than those of typical commercial microfiltration filters under the same flow rates (0.2 psi or water head height of 14 cm). The nanofibrous microfiltration membrane can be facilely scaled up due to the demonstrated mass production capability of electrospun membrane and the simple modification process using cross-linked PEI/GTMACl, or poly(VEVIMIBr). Moreover, the fabrication cost of the nanofibrous microfiltration membrane is relatively low as only water is used as the solvent medium for this process, which minimizes many of the environmental concerns.

The high flux and long usage microfiltration filters of the present invention are formed by surface modification of electrospun nanofibrous scaffolds with cross-linked PEI/GTMACl or polycations (poly(VEVIMIBr)). The composite filter effectively and simultaneously eliminates bacteria and viruses in contaminated drinking water. The efficiency of the microfiltration filters meets the critical requirements where 6 LRV for bacteria and 4 LRV for viruses has been achieved for treatment of up to 1 liter feed solution with initial bacterial or virus concentration of $10^6$ pfu/mL and at a pH of 9, while the pressure drop is over 5 times lower than that of commercial microfiltration counterparts at the same flow rate. The composite microfiltration filter can be readily scaled up for mass production.

The use of nanofibers provides the advantages of (1) large surface to volume ratio without substantially changing the pore size of the membrane; (2) easier surface modifications to accommodate the needs for tailor-designing the nanofiber surfaces for specific targets; and (3) cross-linking the nanofibers so that the materials are integrated and will not be washed out. In many respects, using nanofibers is similar to using "nanoparticles" for large surface areas. However, nanoparticles are more difficult to attach to the scaffold.

The high flux and low pressure drop microfiltration membranes of the present invention have the following advantages:

(1) The filter, with a highly porous electrospun nanoscaffold and a non-woven substrate as support, exhibits high flux and low pressure drop. Moreover, many other porous supports (e.g., filter paper, glass fiber nonwovens, melt blown PET or PP nonwovens) can be used as a non-woven substrate for the fabrication of microfiltration filters for the filtration of viruses.

(2) The cross-linked PEI/GTMACl or poly(VEVIMIBr) is very durable and has a high capacity for virus adsorption which enables such microfiltration filters for purification.

(3) The membrane can be used over a wide range of pH from about 3.0 to about 9.0 for virus removal.

(4) The fabrication of microfiltration membranes can be easily scaled up because the scaled up process for electrospinning is well know in the art and has already been demonstrated.

(5) The functionalization/coating processes of the nanofibrous microfiltration membranes are environmentally friendly since only water is being used as the primary solvent medium.

In a preferred embodiment, the hierarchical composite membrane substrates of the present invention are formed by modifying non-woven, nano- and micro-fibrous substrates (including electrospun nanoscaffolds (PAN and PES) and unmodified micro-fibrous polyester (PET) non-woven webs) with fiber diameters preferably from about 50 nm to 300 microns, more preferably from 50 nm to 50 micron and most preferably from 100 to 400 nm. The surfaces of the substrates were modified by dip-coating with polyethylenimine (PEI)/glycidyltrimethylammonium chloride (GTMACl) cross-linked by ethylene glycol diglycidyl ether (EGdGE), or PEI/glycidyltrimethylammonium chloride (GTMACl) cross-linked by glutaraldehyde (GA), or polyvinyl amine cross-linked by EDdGE, or polyvinyl amine cross-linked by GA, or poly(1-(1-vinylimidazolium)ethyl-3-vinylimdazolium dibromide (VEVIMIBr), as produced by in-situ polymerization. Both Metanil yellow and MS2 were used to challenge test the modified microfiltration membrane. As used herein, the term "challenge test" refers to a method for testing the efficiency of a microfiltration membrane by passing a bacteria or a "challenge particulate" through the membrane and measuring the LRV. High log reduction value (LRV) for MS2 and Metanil has been obtained over a wide range of pH values from 3 to 9.

The present invention has also developed a facile route to modify the nonwoven substrate through surface coating of a thin-layer of charged molecular monomer on the electrospun nanofibers, e.g., sodium acrylate (SA), 1-vinyl-3-butylimidazolium bromide (VBIMIBr), 1-(1-vinylimidazolium) ethyl-3-vinylimdazolium dibromide (VEVIMIBr), or ethoxylated (9) trimethylolpropane triacrylate (SR502), followed by (co-) polymerization induced with a thermal initiator. The pore size and the size distribution of the microfiltration membrane can be correspondingly decreased to assist in achieving the size-exclusion requirement needed for the high retention of bacteria. Meanwhile, the positively charged segments, formed by the polymerization of SA, VBIMIBr, or/and VEVIMIBr, in the polymer network can serve as the adsorption sites for viruses.

The cross-linked polymer network on the surface of nano- and micro-fibrous substrate is durable over a wide pH range and yields long-term utilization because of the higher intrinsic capacity per unit volume. The thickness of the cross-linked polymer network coating is from about 5 to 50 nm, preferably about 5 to 30 nm and most preferably from about 10 to 20 nm. The surface to volume ratio (S/V) is related to the fiber diameter as S/V=2/r, wherein "r" is the radius of the fiber. Thus, for the same amount of fibers, S/V increases by a factor of 50 when the fiber diameter decreases from 10 μm to 100 nm. The change in the dimension of the fiber diameter affects the surface coating process. Moreover, when the amount of fiber materials per unit volume is constant, an increase in the fiber diameter amounts to a decrease in porosity and a decrease in the effective pore size. Thus, these coatings have an added effect in controlling the pore size, which is different from the existing practice.

EXAMPLES

The examples set forth below serve to provide further appreciation of the invention but are not meant in any way to restrict the scope of the invention.

Example 1

Materials.

Branched polyethylenimine (PEI) with an average molecular weight of 25 kDa, ethylene glycol diglycidyl ether (EGdGE), and Metanil yellow were purchased from Aldrich Chemical Company, Milwaukee, Wis. (Aldrich). PAN electrospun membranes were fabricated at Stony Brook. Monomer ethoxylated (9) trimethylolpropane triacrylate (EOTMTA) was purchased from Polysciences, Inc., Warrenton, Pa. and the inhibitor was removed before use. The thermal initiator potassium persulfate ($K_2S_2O_8$) was obtained from Fluka, Switzerland. Electrospun polyacrylonitrile (PAN) ($M_w$ about 150 kDa, purchased from Aldrich) nanofibrous scaffolds were deposited on an aluminum foil by electrospinning. Polybead microspheres particle suspensions (about 2.6 wt %, 0.20 μm) were purchased and diluted in deionized (DI) water to 100 ppm as the model feed solution for waterborne bacteria. Bovine Serum Albumin (BSA) was purchased from Sigma-Aldrich. *E. coli* was purchased from the American Type Culture Collection (ATCC), and MS2 was incubated following the developed procedure.

Example 2

Preparation of VEVIMIBr.

18.8 g (0.20 mol) of 1-vinylimidazole and 18.8 g (0.20 mol) of 1,2-dibromoethane were dissolved in 150 mL of acetonitrile. The mixture was heated at 60° C. for 48 hours, and subsequently cooled down to room temperature. The resulting solid sample was precipitated and washed with ethyl ether three times. VEVIMIBr was obtained as a white powder after being dried in a vacuum oven. The yield from this reaction was about 95%. The spectra of 1H NMR (DMSO-d6 as the solvent, δ, ppm) of VEVIMIBr were 9.638 (N—CH—N, s, 2H), 8.266 (N—CH—CH, s, 2H), 7.894 (N—CH—CH, s, 2H), 7.306-7.387 (N—CH=, tetra, 2H), 5.949-6.009 and 5.413-5.450 (N—CH=CH2, d, 4H), 4.822 (N—CH2, s, 41-1).

Example 3

Preparation of Monomer Aqueous Solutions.

The monomer aqueous solutions were prepared by dissolving a predetermined amount of monomers and initiator ($K_2S_2O_8$) in DI water by stirring at room temperature for 1 hour. Table 1 lists the compositions of the solutions used.

TABLE 1

Composition of monomer aqueous solutions (I) and (II) for coating

| Solutions | EOTMTA (wt %) | VEVIMIBr (wt %) | $K_2S_2O_8$ (wt %) | Loading of polymer (mg/cm³) |
|---|---|---|---|---|
| I | 0.2 | — | 0.02 | 9.5 ± 1.9 |
| II | — | 0.8 | 0.04 | 41.8 ± 4.0 |

Example 4

PAN electrospun membrane (Example 1) was soaked in monomer aqueous solution II (Example 3) with the VEVIMIBr composition. The excess solution was drained with a fast drawdown tool. The membrane was heated at 110° C. for 30 minutes and used after thoroughly being washed with water to remove any un-reacted monomers.

Example 5

Ultra-Thin Coating Layer Formed by Free Radical Polymerization of Multi-Vinyl Monomers.

The structures of the monomers EOTMTA and VEVIMIBr, label (I) and (II), respectively, are shown below:

In the coating process, the surface of PAN electrospun nanofibers was covered with a thin layer of monomers and thermal initiator in the aqueous solution. The thermal initiator which could generate free radicals induced the polymerization of EOTMTA (or VEVIMIBr) present on the surface of the nanofibers. Ultimately, an ultra-thin polymer network was formed during the drying process. EOTMTA monomer with three vinyl groups was served as a "cross-linker" to form the polymer network on the surface, especially at the cross-points of electrospun nanofibers. The mechanical properties of electrospun nanoscaffolds were significantly improved after polymerization which was confirmed by the tensile experiments (Example 10). In this way it was determined that poly(EOTMTA) modified PAN electrospun membrane was suitable for use as a self-standing membrane for microfiltration.

Example 6

The thickness of the coating polymer used depends on the surface area of the modified nanofibers which can be calculated using equation (1).

$$S = 2\pi r L_0 = \frac{2m_0 r}{d_0 r_0^2} \quad (1)$$

wherein $L_0$ is the length of electrospun nanofibers, $m_0$ (g) is the mass of PAN electrospun nanofibers, $r_0$ (cm) is the radius of the electrospun nanofiber, $d_0$ (g/cm3) is the density of PAN, r is the radius of the modified nanofibers, and S (cm²) is the surface area. Assuming that the coating layer along the nanofiber surface is uniform, the relationship between the coated polymer volume (V, cm³) and the radius of modified nanofibers (r, cm) can be expressed by equation (2).

$$V = \int_{r_0}^{r} S\,dr = \frac{2m_0}{d_0 r_0^2}\int_{r_0}^{r} r\,dr = \frac{2m_0}{d_0 r_0^2}(r^2 - r_0^2) = \frac{2m_0}{d_0}\left(\frac{r^2}{r_0^2} - 1\right) \quad (2)$$

Thus, the thickness of the coating layer (r-r$_0$) can be controlled by the loading volume of polymer (V) with $$r = r_0 \sqrt{\left(\frac{Vd_0}{2m_0} + 1\right)} \quad (3)$$

The thickness of the coating layer is proportional to the fiber diameter (r$_0$) and the concentration of monomer solution. It has been found that about 0.8 to about 1.0 wt % of monomer aqueous solution is used to achieve a relatively uniform coating layer. For 1 g of PAN electropsun nanofibers with a fiber diameter of 150±30 nm, the thickness of the coating layer is about 15 nm.

A monomer tethered positively charged imidazolium cation, VEVIMIBr, was synthesized and used for the fabrication of a positively charged MF membrane. The membrane was then expected to have high adsorption capacity of negatively charged species, such as a bacterophage MS2 which is typically regarded as a model of waterborne viruses.

Example 7

Figure 1:
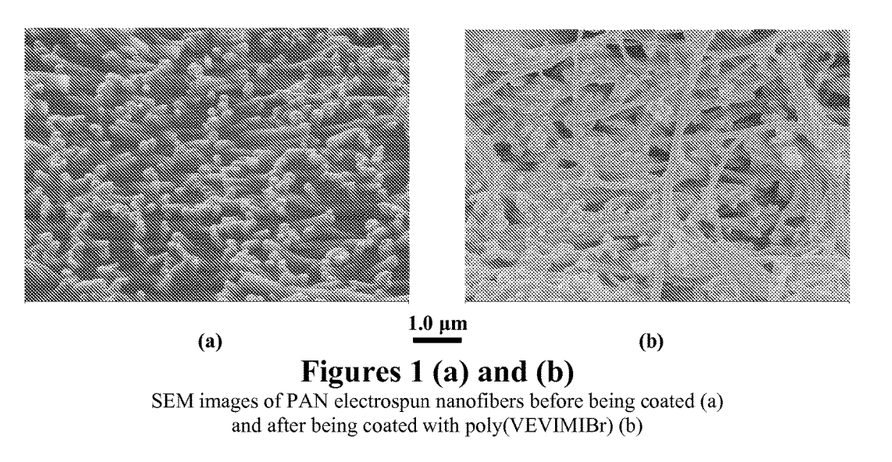
FIG. 1(a) shows SEM images of PAN electrospun nanofibers before being coated and FIG. 1(b) shows the nanofibers after being coated with poly(VEVIMIBr).

FIG. 1 shows SEM images of PAN electropsun nanofibers and of the coated nanofibers with poly(VEVIMIBr) (Example 4). The diameter of PAN electrospun nanofibers nanofibers was 150±30 nm estimated from FIG. 1 (a) with Leika software developed at Stony Brook. FIG. 1 (b) shows that the nanofibers became wrapped with poly(VEVIMIBr), especially at the cross-points of nanofibers, which is good evidence for the improved mechanical properties discussed in Example 10.

Example 8

Figure 2:
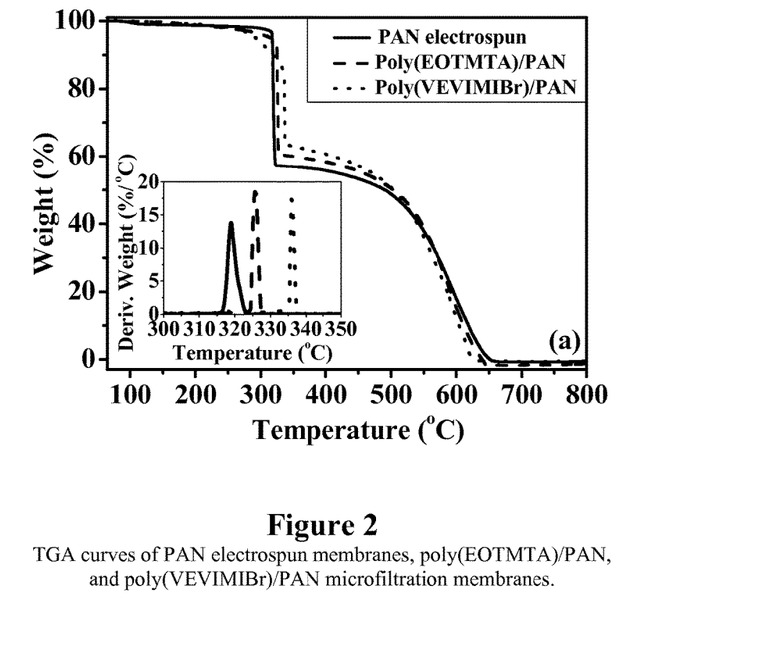
FIG. 2 is a graph showing TGA curves of PAN electrospun membranes, poly(EOTMTA)/PAN, and poly(VEVIMIBr)/PAN microfiltration membranes

Thermal gravimetric analysis (TGA) scans of the samples were collected at 10° C./min from 60° C. to 800° C. under an air flow using the TGA7 instrument from Perkin-Elmer Inc. The decomposition temperature of PAN electrospun nanofibers started at 317.2° C. and rapidly lost 41.8% of its mass during a drop of 5° C., as shown in FIG. 2. However, the cross-linked PAN with poly(EOTMTA) began rapidly decomposing at 324.6° C. and lost 39.1% within 2.4° C., while poly(VEVIMIBr) decomposed rapidly from 334.8° C. and lost 36.4% within 2.4° C. This change could be observed clearly from the derivative weight percent of the nanofibers. The maximum nanofiber mass reduction rate increased from 319.0° C. to 325.6 and 336.0° C., respectively, after functionalization by poly(EOTMTA) and poly(VEVIMIBr). The decomposition temperature of the PAN electrospun nanofibers stabilized at higher temperatures for samples with poly(VEVIMIBr) than with poly(EOTMTA). This could be attributed to different amounts of loading: the former was 41.8±4.0 mg/cm³ while the later was 9.5±1.9 mg/cm³, being about 4.4 times lower (Example 3).

Example 9

Figure 3:
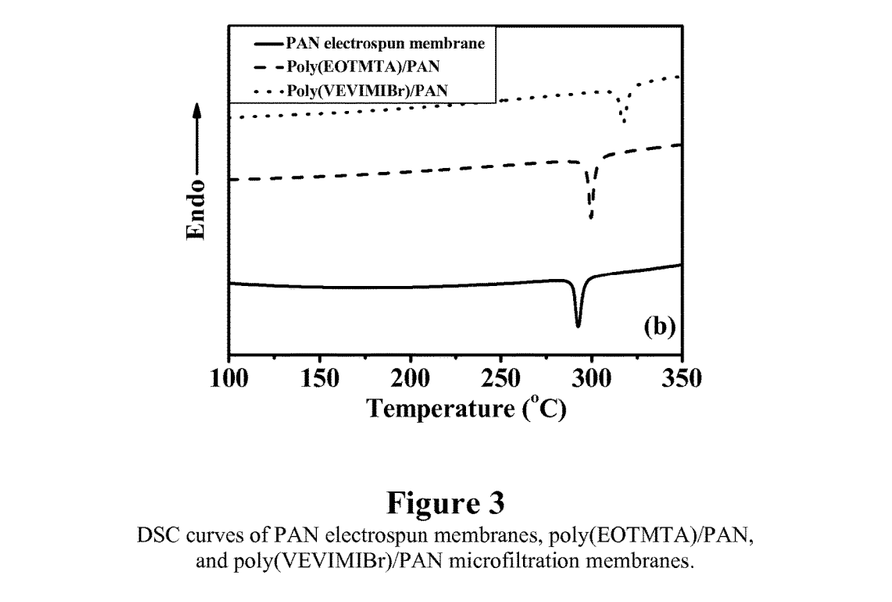
FIG. 3 is a graph showing DSC curves of PAN electrospun membranes, poly(EOTMTA)/PAN, and poly(VEVIMIBr)/PAN microfiltration membranes.

The conclusion in Example 8 was further confirmed by the DSC results as shown in FIG. 3. The temperature during the oxidized cyclization of PAN-based MF membranes increased significantly after coating of poly(EOTMTA) and poly(VEVIMIBr) from 292.7° C. to 299.7° C. and 317.3° C., respectively. This was probably due to the surface coating layer retarding the cyclization, which led to an increase in temperature. The poly(VEVIMIBr)/PAN retained higher stability when compared with the poly(EOTMTA)/PAN membrane, which closely matched the results from TGA. The findings also suggest that the surface modification may have been successful.

Example 10

Figure 4:
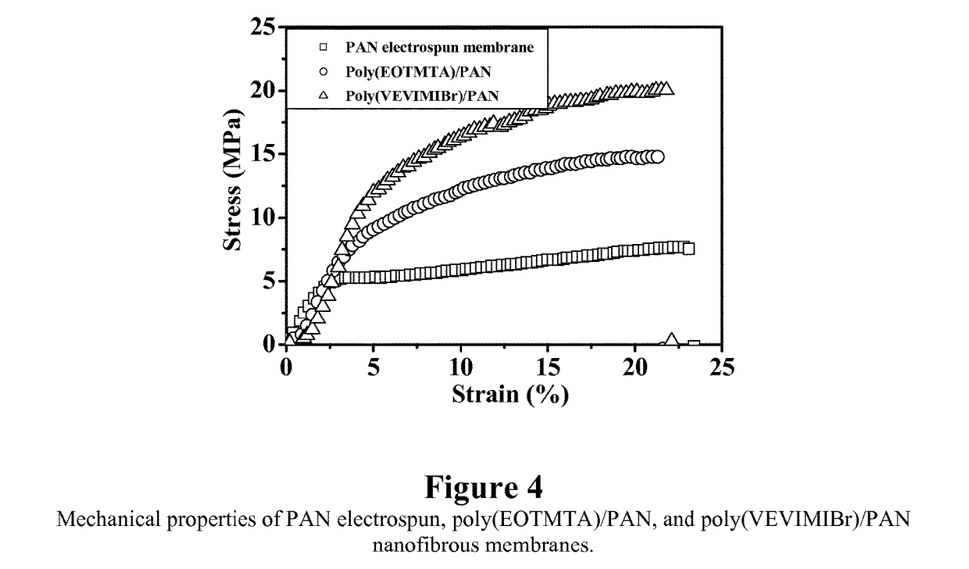
FIG. 4 is a graph showing the mechanical properties of PAN electrospun, poly(EOTMTA)/PAN, and poly(VEVIMIBr)/PAN nanofibrous membranes.

The samples in Example 4 were uniaxially stretched at room temperature using a modified INSTRON® 4442 tensile apparatus (Instron Industrial Products Group, Grove City, Pa.) to carry out the symmetric deformation. The initial distance between the INSTRON® jaws was 10 mm and the chosen stretching rate was 5 mm/min. The mechanical properties of poly(EOTMTA) and poly(VEVIMIBr) modified PAN nanofibrous membranes were found to be significantly improved over that of the PAN electrospun membrane, as shown in FIG. 4. No yield point could be observed from the tensile experiments on the modified PAN nanofibrous membranes. However, the ultimate tensile strength was increased by about 3 to 4 fold. The results are evidence of the formation of a polymer network layer on the surface of PAN nanofibers, especially at the crossover points among the nanofibers, i.e., the polymerization of EOTMTA and VEVIMIBr has successfully "crosslinked" the electrospun nanofibers and "soldered" the crossover points together. Moreover, the experimental evidence that the elongation to break and Young's modulus remained mostly unchanged, demonstrates that the modified nanofibrous membrane can be used as a self-supporting filter.

Example 11

Figure 5:
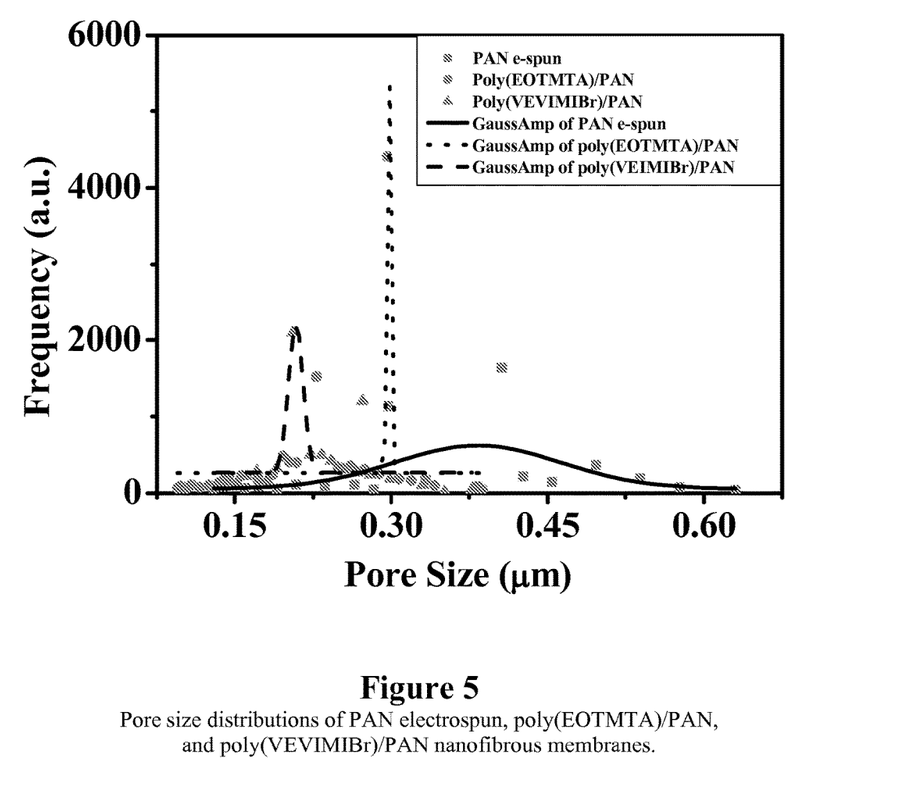
FIG. 5 is a graph showing pore size distributions of PAN electrospun, poly(EOTMTA)/PAN, and poly(VEVIMIBr)/PAN nanofibrous membranes.

Bubble point, mean pore size and pore size distribution of the samples in Example 4 were measured using a capillary flow porometer (FPA-1500A) (Porous Materials, Inc., Ithaca, N.Y.). A wetting fluid, GALWICK®, with a surface tension of 15.9 dynes/cm was used to wet the membrane. FIG. 5 shows the pore size and pore size distribution of PAN electrospun membrane, poly(EOTMTA)/PAN, and poly (VEVIMIBr)/PAN nanofibrous membranes. The mean pore size of PAN electrospun nanoscaffolds was 0.41 μm and a broad distribution of pore size was observed. After surface modification with poly(EOTMTA), and poly(VEVIMIBr), the mean pore size of the membrane decreased to about 0.21 μm and about 0.27 μm, respectively, with a much narrower pore size distribution, further implied by the results of 0.2 μm-particles retention.

Example 12

Water flux and particle retention was challenge tested with custom-built devices, while the pore size distribution was measured with the capillary flow porometer (FPA-1500A) with GALWICK® as the fluid. The particle filtration of cellulose nano-whisker microfiltration membrane was performed under the flow rate of 1.0 mL/min for a total of 10 mL of suspension, where the particle concentration of the permeate and that of the feed solution was measured with a total organic carbon analyzer (TOC-5000, Shimadzu Scientific Instruments, Inc., Columbia, Md.). All data were collected and repeated by using three (3) duplicated samples. The maximum pore size, mean pore size, water permeability, and 0.2-μm particle retention of the nanofibrous membranes, as well as an available commercial MF membrane GS0.22, are listed in Table 2.

TABLE 2

Pore size, water permeability, and 0.2-μm particle retention of nanofibrous membranes

| Samples | Maximum pore size (μm) | Mean pore size (μm) | Water permeability (Lm$^{-2}$h$^{-1}$psi$^{-1}$) | 0.2-μm particle retention (%) |
|---|---|---|---|---|
| PAN electrospun nanoscaffolds | 0.66 | 0.41 | 950 | 13.7 |
| Poly(EOTMTA)/PAN | 0.55 | 0.28 | 620 | 50.3 |
| Poly(VEVIMIBr)/PAN | 0.40 | 0.21 | 430 | 96.5 |
| GS0.22 | 0.48 | 0.23 | 170 | 12.2 |

Both the maximum pore size and the mean pore size of the PAN electrospun membrane decreased after surface modification with a cross-linked polymer network layer. The mean pore size decreased to 0.21 μm, implying that the poly(VEVIMIBr)/PAN nanofibrous membrane could eliminate most of waterborne bacteria which was confirmed by the retention of 0.2-μm particle suspension. The retention of the particle increased from 13.7% to 96.5% after modification, while the water permeability decreased by 55%, which is, however, still 2.5 times higher than that of commercial GS0.22 membrane. Moreover, the water contact angle of poly(EOTMTA)/PAN and poly(VEVIMIBr)/PAN nanofibrous membranes decreased significantly to 22.4° and 18.0°, respectively, when compared with that of the original PAN electrospun membrane at 50.6°. The super hydrophilic surface of nanofibrous membranes should improve its antifouling properties.

Example 13

Due to the imidazolium cation tethered in poly(VEVIMIBr), poly(VEVIMIBr)/PAN nanofibrous membrane, the membrane was expected to exhibit high adsorption capacity of viruses in addition to improved mechanical properties and pore size/pore size distribution. Bovine serum albumin (BSA) is a model protein with an isoelectric point (pI) of 4.7, which should become negatively charged at pH 7.2. 1.0 mg/mL of BSA in a phosphate buffer solution (PBS, pH 7.2), was employed to challenge both the poly(VEVIMIBr)/PAN nanofibrous membrane and the GS0.22 commercial membrane fabricated with nitrocellulose at 37° C. (As used herein, the "isoelectric point" or "pI" is the pH at which a particular molecule or surface carries no net electrical charge.) The adsorption capacity of BSA in the nanofibrous MF membrane was measured batch wise. 0.03 g of nanofibrous membrane was immersed in 10 mL BSA solution (1.0 mg/mL) in PBS (pH=7.2) on a shaking bed for a period of from about 0 to about 9 hours. The amount of the BSA adsorbed on the membrane was calculated from the concentration change of the BSA solution before and after the adsorption, as determined by optical absorption at 279.9 nm. The maximum adsorption capacity was determined by using the Langmuir adsorption isotherm when different concentrations of BSA of 1.0, 0.5, 0.25, and 0.1 mg/mL were used.

Figure 6:
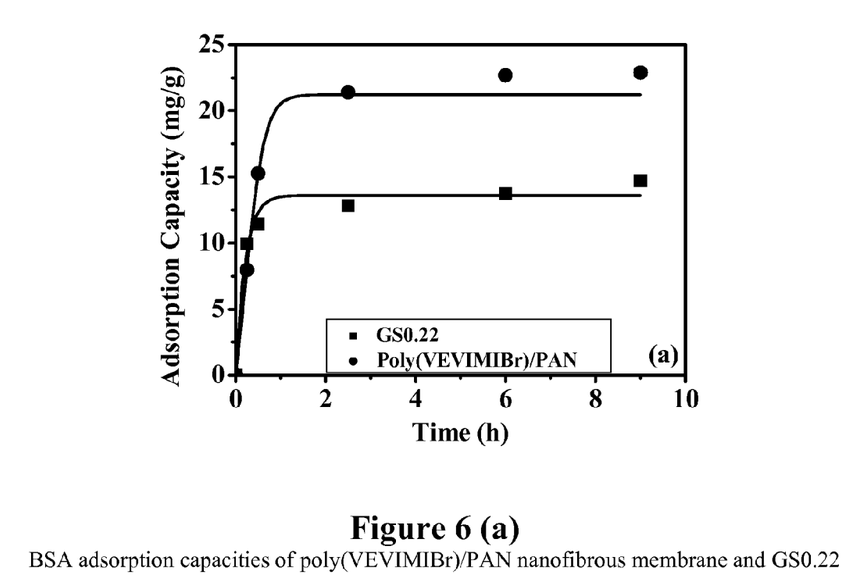
FIG. 6(a) is a graph showing the static adsorption of BSA for poly(VEVIMIBr)/PAN nanofibrous membrane and the commercial GS0.22 microfiltration membrane.
FIG. 6(b) shows the Langmuir adosorption isotherm for the same two membranes.

After 2.5 hours, the concentration of BSA was assumed to have reached equilibrium and the adsorption of BSA to the nanofiber membrane was complete. FIG. 6 (a) shows the adsorption capacity as a function of time.

The membranes became saturated after adsorbing for 2.5 hours in 1 mg/mL of BSA buffer solution. The adsorption capacity of poly(VEVIMIBr)/PAN nanofibrous membrane was 22.9 mg/g, which was 65% higher than that of the commercial GS0.22 microfiltration membrane. The pI of BSA is 4.7, which is mostly negatively charged at pH 7.2. Therefore, positively charged poly(VEVIMIBr)/PAN nanofibrous membrane has a high adsorption capacity due to electrostatic interactions. The maximum adsorption capacity can be obtained by fitting with the Langmuir adsorption isotherm in equation (4).

$$1/q_e = 1/q_m + k_d/q_m \times (1/c_e) \qquad (4)$$

wherein $q_m$ is the maximum adsorption of a monolayer coverage (mg/g) and $k_d$ is the Langmuir adsorption equilibrium constant (mL/mg), this reflects the affinity of the membrane binding sites. From FIG. 6 (b) and equation (4), the maximum adsorption of BSA by poly(VEVIMIBr)/PAN nanofibrous membrane was 35.1 mg/g, which was about 2 times higher than that of GS0.22 with 18.5 mg/g membrane, indicating the potential application of poly(VEVIMIBr)/PAN nanofibrous membrane as a highly efficient MF filter.

Example 14

Bacterial challenge tests were performed with 10 mL of E. coli suspension (about 10$^6$ cfu/mL) in a dead-end filtration stirred cell (Millipore 8050-5122, stirring at 300 rpm) at room temperature. 10 mL of the suspension was filtered through the membrane at a constant flow rate (192 L/m$^2$h), while the low pressure drop was observed as 0.2 psi. The permeation flux and the pressure drop were monitored during the test. Bacteriaphage, MS2, was used as a model virus particle to evaluate the adsorption capacity of the cellulose nanowhisker MF membrane at 20° C. The MS2 phage with an initial concentration of about 10$^6$ plaque forming unit (pfu)/mL was suspended in phosphate buffer solution (pH=7.2). 10 mL of the suspension was filtered through the membrane at a constant flow rate (192 L/m$^2$h), while the low pressure drop was observed as 0.2 psi. The permeate was collected in an autoclaved vial, and the virus concentration was determined by the pfu method. For the pfu measurement, E. coli (American Type Culture Collection (ATCC) 15597-B1) was used as a viral host bacterium and trypticase soy agar plates (Teknova) were used to obtain 10-100 pfu/plate at various dilution ratios of the permeate. All experiments were repeated a minimum of three times.

TABLE 3

Permeate flux, pressure drop, and retention of nanofibrous MF membranes and GS0.22 for E-coli and MS2 suspension.

| Membrane | Permeation flux (L/m$^2$h) | Pressure drop (psi) | E-coli retention (LRV) | MS2 retention (LRV) |
|---|---|---|---|---|
| PAN electrospun | 192 | 0.2 | 6 | 0 |
| Poly(EOTMTA)/PAN | 192 | 0.2 | 6 | 0 |
| Poly(VEVIMIBr)/PAN | 192 | 0.3 | 6 | 4 |
| GS0.22 | 192 | 1.1 | 6 | 1 |

All of the MF membranes in Table 3 have a relatively low pressure drop (<2 psi) and a high retention of E. coli.

However, PAN electrospun and poly(EOTMTA)/PAN membranes without a charged surface had zero retention for MS2. In contrast, the positively charged membrane poly (VEVIMIBr)/PAN had full retention up to 4 LRV. The commercial GS0.22 had 1 LRV retention and a relatively higher pressure drop when compared with that of poly (VEVIMIBr)/PAN nanofibrous membranes. The durability of poly(VEVIMIBr)/PAN nanofibrous membrane has been determined by washing the membrane with pure water for 14 days and by challenging the membrane again with $10^6$ pfu/mL of MS2 suspension, nevertheless, higher than 3 LRV against MS2 has yet to be achieved using the membrane.

Example 15

Modification of PAN/AWA Substrate with PEI/EGdGE.

PAN/AWA filter from a continuous electro-spinning process was coated with a mixture of PEI (1.0 wt %) and ethylene glycol diglycidyl ether (EGdGE) (a cross-linker, 0.2 wt %). In detail: a piece of PAN/AWA membrane with an effective area of 100 $cm^2$ was immersed in the solution of PEI (1.0 wt %) and EGdGE (0.2 wt %) for 30 seconds. The membrane was put on a glass plate and taped on both sides by the Sealast Vibac tape (the thickness of the tape was 0.04 mm, each side was taped 2 layers). The excess amount of solution was drained by using a glass rod and was kept at 17.5 mg/$cm^2$ of PEI and EGdGE solution in the membrane. The membrane was dried by heating at 110° C. for 20 minutes. 0.2 mg/$cm^2$ of PEI had been loaded on the PAN/AWA membrane by using this process.

Example 16

Modification of PET Substrate with PEI/EGdGE.

Polyethylene terephthalate (PET) from Germany, Novatexx 2413, was coated with a mixture of PEI (1.0 wt %) and ethylene glycol diglycidyl ether (EGdGE) (a cross-linker, 0.2 wt %). In detail: a piece of PET with effective area of 140.5 $cm^2$ was immersed in the solution of PEI (1.0 wt %) and EGdGE (0.2 wt %) for 30 seconds. The excess amount of solution was drained by a glass rod and was kept at 18.5 mg/$cm^2$ of PEI and EGdGE solution in the membrane. The membrane was dried by heating at 110° C. for 20 minutes. 0.2 mg/$cm^2$ of PEI was loaded on the PET membrane by using this process.

Example 17

Modification of PAN/PET Substrate with PEI/GTMACl/EGdGE.

PAN/PET was coated with a mixture of PEI, glycidyltrimethylammonium chloride (GTMACl), and ethylene glycol diglycidyl ether (EGdGE). In detail: a piece of PET with an effective area of 140.5 $cm^2$ was immersed in the solution of PEI, GTMACl, and EGdGE for 30 seconds. The excess solution was drained by a glass rod and 18.6 mg/$cm^2$ of PEI and EGdGE solution was kept in the membrane. The membrane was dried by heating at 110° C. for 25 minutes. 0.15 mg/$cm^2$ of GTMACl has been loaded on the PET membrane by using this process.

Example 18

Testing Procedure of Samples (Examples 15-17) Adsorbed Metanil Yellow.

25-mm samples discs were washed with distilled water for 10 minutes at 3.0 mL/min or 60 minutes at 3.0 mL/min, respectively. 47-mm sample discs were washed with pure water for 10 minutes at 10 min/mL. A 25-mm diameter commercial CUNO® membrane (Cuno, Inc., Meriden Conn.) was used as a control sample and treated with the same procedure. Metanil yellow (1.5 ppm or 10 ppm) was used and the solution flow rate was kept at 3.0 mL/min for the 25-mm sample discs or 10 mL/min for the 47-mm sample discs. The permeates were collected at different times, from 0 minutes up to 180 minutes. The measurements were repeated using new membranes at least twice and were found to be reproducible. UV-visible spectroscopy was used to determine the Metanil yellow concentration of the permeate at 434.2 nm.

Example 19

Figure 7:
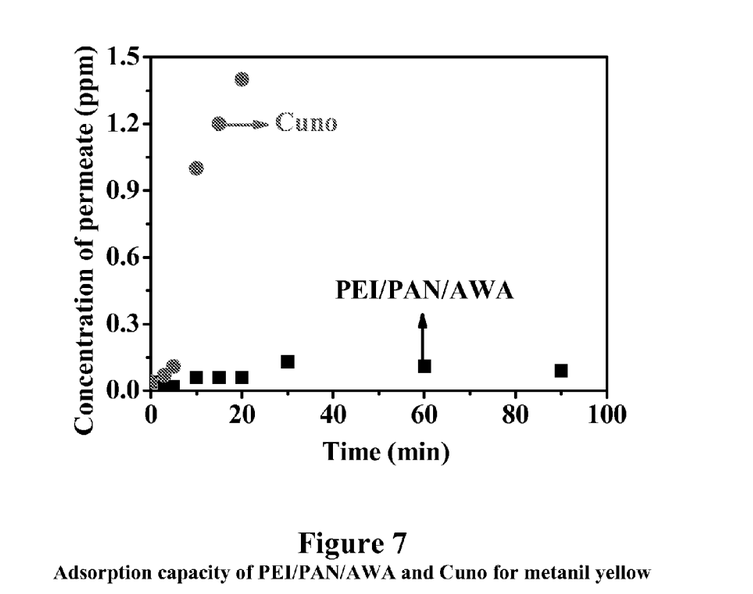
FIG. 7 is a graph showing the adsorption capacity of PEI/PAN/AWA and Cuno filter at pH=7.

FIG. 7 shows the adsorption capacity of PEI/PAN/AWA and of the CUNO® sample. 3-mL of the permeate were collected after each time interval and the amount of Metanil yellow was measured using UV as described above. PEI/PAN/AWA and CUNO® membranes were washed with pure water for 10 minutes at 3 mL/min before the test. Up to 20 minutes of adsorption, the CUNO® sample had 0 of retention, while PEI/PAN/AWA still had retention of 93.8%±0.2%. The values started to deviate even after the first 5 minutes, indicating that the CUNO® sample could not adsorbed the dye very quickly and soon lost its capacity after about 10 minutes. The CUNO® sample failed after about 20 minutes with the remaining dye passing through the membrane. The PEI/PAN/AWA membrane (value repeated twice) remained effective after 90 minutes for the adsorption which is 4-5 times higher than that of CUNO® sample.

Example 20

Figure 8:
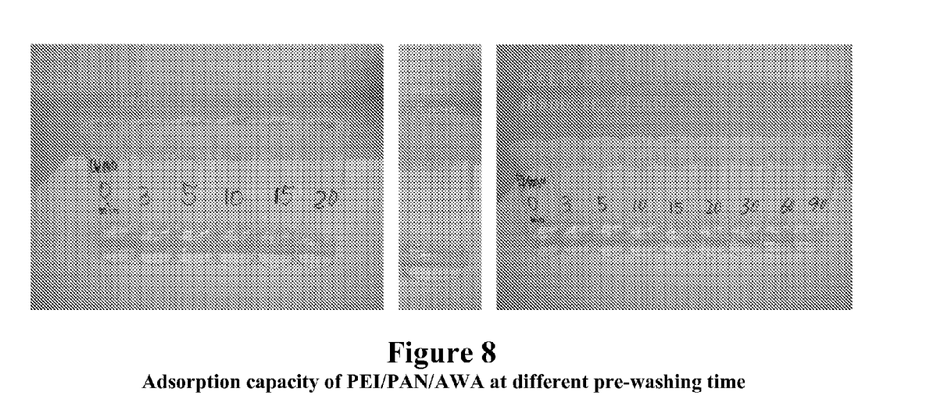
FIG. 8 shows test tubes that illustrate the adsorption capacity of PEI/PAN/AWA

FIG. 8 shows the collected permeates from Example 19. It was observed that, after 5 minutes, the CUNO® filter was beginning to fail. However, the PEI/PAN/AWA membrane could be used after 90 minutes without much loss of retention.

Example 21

Figure 9:
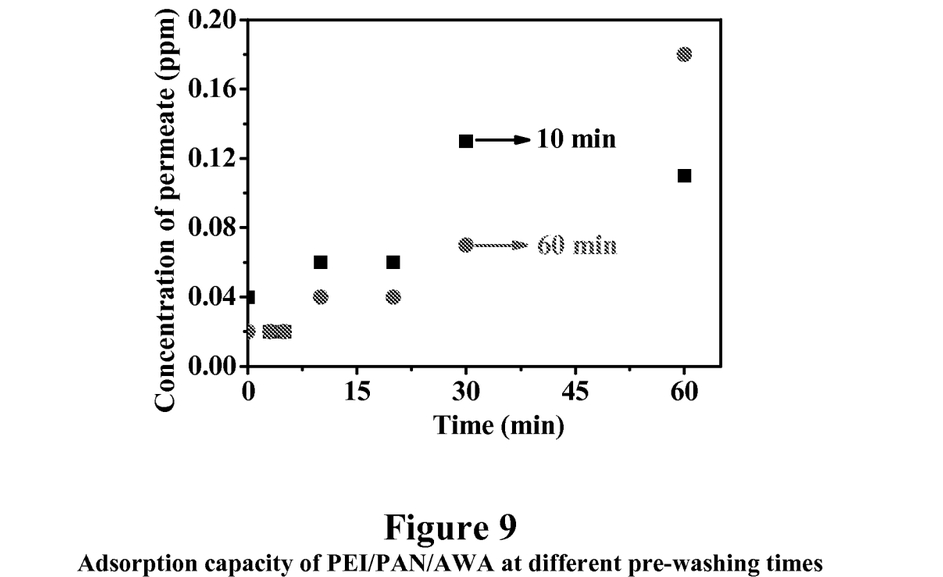
FIG. 9 is a graph showing the adsorption capacity of PEI/PAN/PET membrane at different prewashing times.

The adsorption capacity of PEI/PAN/AWA membranes (prepared in Example 15) at different washing time is shown in FIG. 9. No obvious difference was observed from the adsorption results of the samples after pre-washing for 10 minutes and 60 minutes, respectively. FIG. 9 shows the adsorption capacity of PEI/PAN/AWA membranes and a CUNO® filter on an expanded scale for the concentration of permeate. The 10-minute result using another membrane is similar to that of FIG. 7, indicating the reproducibility of the results for the samples. The result indicates that the cross-linked PEI could be wrapped around the PAN nanofibers and could form a permanent polymer network, which can be retained in the membrane after pre-washing for a long time.

Example 22

Figure 10:
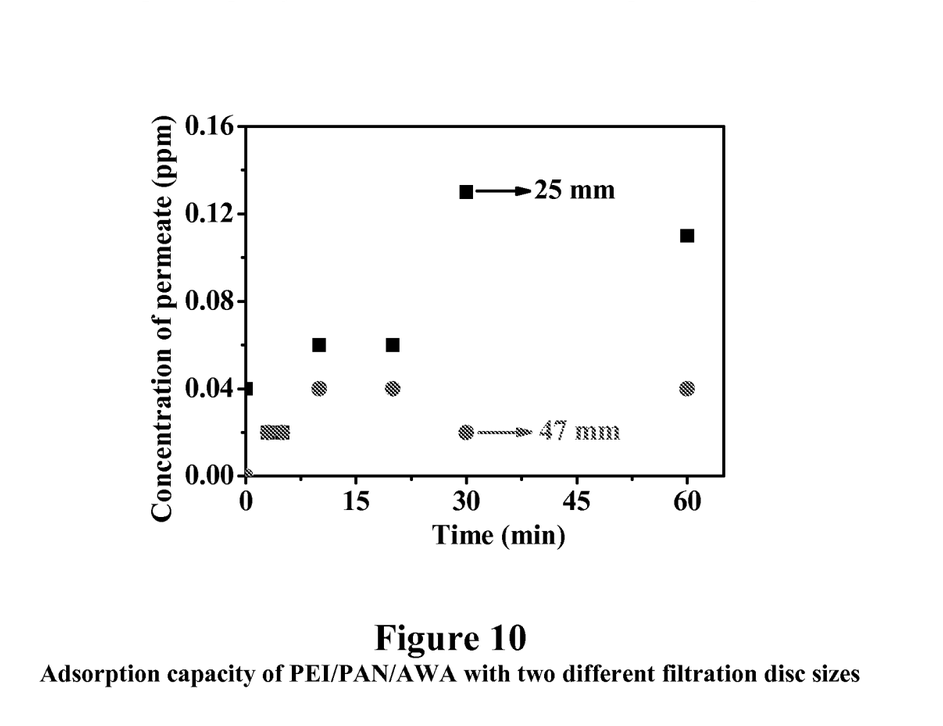
FIG. 10 is a graph showing the adsorption capacity of PEI/PAN/AWA with two different filtration disc sizes.

The adsorption capacity of PEI/PAN/AWA membranes (from Example 15) by using two different filtration disc areas (prepared in Example 15) is shown in FIG. 10. A 47-mm diameter sample disc was challenge tested. The membrane was pre-washed for 10 minutes at 10 mL/min and the adsorption experiment was carried out for 60 minutes at 10 mL/min of 1.5 ppm Metanil yellow. The result was compared with that obtained from the 25-mm diameter PEI/PAN/AWA sample

Example 23

MS2 with $1.70 \times 10^5$ pfu/mL (the maximum LRV was 5.2) was used to challenge test PEI/PAN/AWA sample disc (47 mm diameter from Example 15) at 9 mL/min flow rate, pH=6.5 and operated at room temperature. The results are shown in Table 4.

TABLE 4

MS2 dynamic adsorption of PEI/PAN/AWA filter

| Sample | Total Volume processed (ml) | Pressure (psi) | LRV (MS2) | pH |
|---|---|---|---|---|
| CUNO ® | 0 | 0 | 4.8 | 6.5 |
| CUNO ® | 125 | 0 | 2.9 | 6.5 |
| CUNO ® | 250 | 0 | 1.6 | 6.5 |
| CUNO ® | 375 | 0 | 1.2 | 6.5 |
| CUNO ® | 500 | 0 | 1.0 | 6.5 |
| AHLSTROM ® | 0 | 0.2 | 5.9 | 6.5 |
| AHLSTROM ® | 250 | 0.19 | 5.9 | 6.5 |
| AHLSTROM ® | 500 | 0.2 | <1 | 6.5 |
| AHLSTROM ® | 750 | 0.17 | <1 | 6.5 |
| AHLSTROM ® | 1000 | N/A | <1 | 6.5 |
| PEI/PAN/AWA | 0 | 0.15 | 5.2 | 6.5 |
| PEI/PAN/AWA | 125 | 0.22 | 5.2 | 6.5 |
| PEI/PAN/AWA | 250 | 0.27 | 5.2 | 6.5 |
| PEI/PAN/AWA | 375 | 0.33 | 5.2 | 6.5 |
| PEI/PAN/AWA | 500 | 0.4 | 3.1 | 6.5 |
| PEI/PAN/AWA | 1000 | 0.68 | <0.5 | 6.5 |
| PEI/PAN/AWA | 1250 | 0.86 | <0.5 | 6.5 |
| PEI/PAN/AWA | 1500 | 1.03 | <0.5 | 6.5 |

PEI/PAN/AWA had a higher usage than that of both commercial membranes, especially the CUNO® sample with a reasonable higher pressure drop. About 2 to 3 times longer usage of PEI/PAN/AWA is shown in Table 4, when compared with commercial filters. The pressure drop of PEI/PAN/AWA increased during the test due to clogging by the viruses on the pores of the filter. The PEI/PAN/AWA filter was not only used for viruses adsorption, but it also can have high retention (>6 LRV) for bacteria (including *E. coli* and *B. diminuta*). However, CUNO® and AHLSTROM® filters were used only for viruses because these membranes had larger pore sizes.

Example 24

Figure 11:
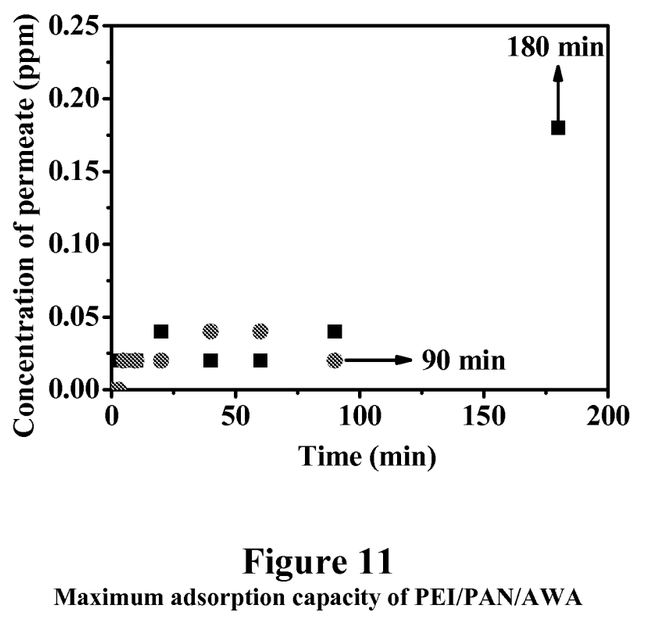
FIG. 11 is a graph showing the maximum adsorption capacity of PEI/PAN/AWA.

The PEI/PAN/AWA membrane from Example 15 was further challenge tested up to 180 minutes with 1.5 ppm of Metanil yellow solution for different performing time, 90 and 180 minutes, respectively. The results are shown in FIG. 11. The flow rate of the feed solution was 3 mL/min using a 25 mm diameter filter. The pressure drop of the membrane was monitored during the test process.

It was observed that the retention for Metanil yellow was maintained above 90% after 180 minutes of adsorption. The pressure drop was 3.5 psi after testing for 90 minutes. However, the pressure drop increased from 1.2 to 14 psi after testing for 180 minutes, which indicated that the PEI/PAN/AWA membrane was clogged after long-term adsorption (up to 3 hours with 1.5 ppm dye). To address this problem, PET was employed as the support for the fabrication of cross-linked PEI modified microfiltration membrane, as shown in Example 25.

Example 25

Figure 12:
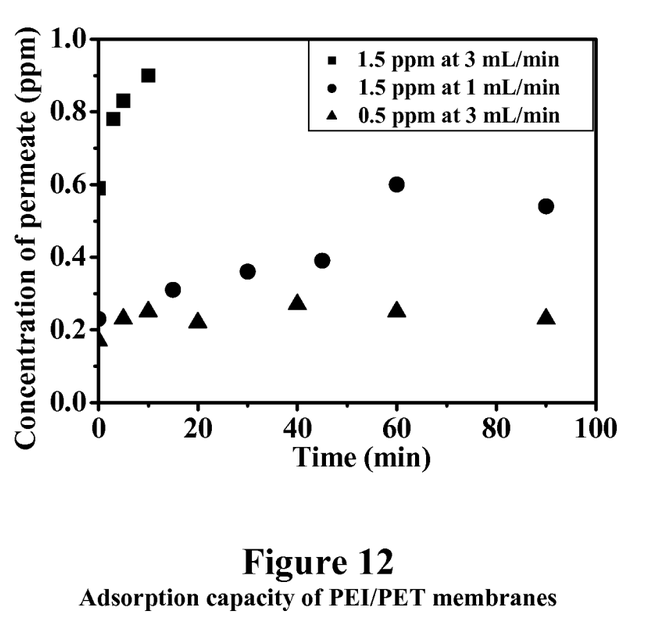
FIG. 12 is a graph showing the adsorption capacity of PEI/PET membranes.

The cross-linked PEI/PET membrane discs from Example 16 with a diameter of 25 mm were washed with pure water for 10 minutes at 3 mL/min and challenge tested for adsorption of Metanil yellow solutions at different concentrations and different flow rates, as shown in FIG. 12. The PEI/PET membrane was challenge tested with Metanil yellow aqueous solutions at different concentrations. The PEI/PET membrane failed very quickly for the 1.5 ppm solution. However, a fairly high retention was observed for up to 90 minutes when the flow rate was decreased to 1 mL/min or the concentration of the dye solution was decreased to 0.5 ppm. More importantly, the pressure drop was about 0 psi during the filtration process. This result shows that substrates with large pore sizes can be used as low-pressure filters after treatment with the surface modifiers of the present invention.

Example 26

Figure 13:
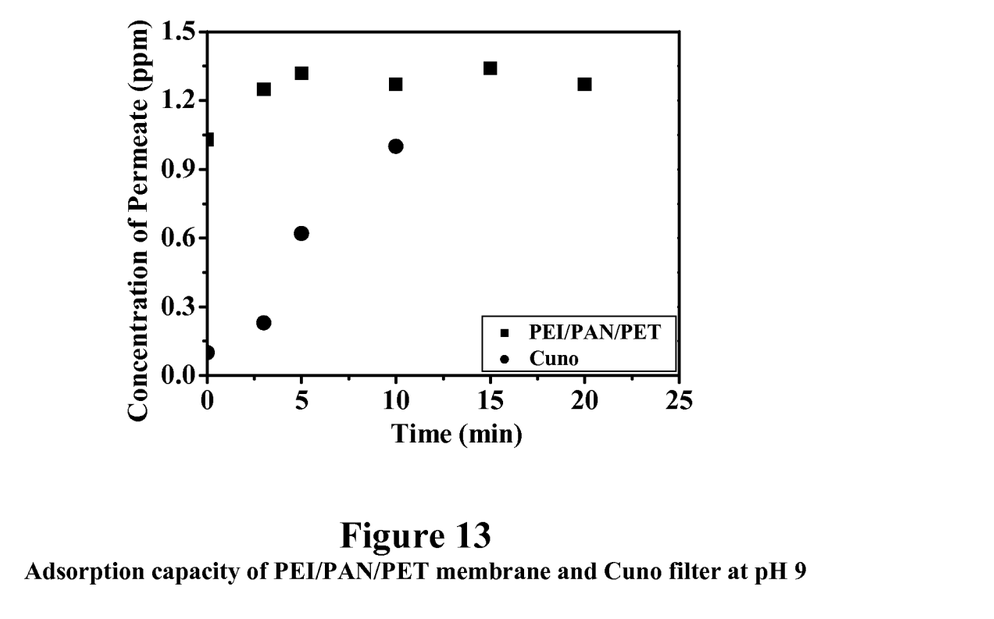
FIG. 13 is a graph showing the adsorption capacity of PEUPAN/PET membrane and CUNO® filter at pH 9.

A high pH solution was used to challenge test the cross-linked PEI/PAN/AWA membrane from Example 15 as well as the commercial CUNO® microfiltration filter. Membrane discs with a diameter of 25 mm were washed with pure water for 10 minutes at 3 mL/min. 1.5 ppm Metanil yellow solution at a pH of 9 was used for the test and the flow rate was 3 mL/min. The thickness of the CUNO® filter was about 300 µm, whereas that of the PEI/PAN/AWA membrane was about 150 µm. The thickness of the PAN substrate in the cross-linked PEI/PAN/AWA membrane was about 50 µm. All membranes failed the adsorption test after about 5 minutes. The pressure drop of the CUNO® filter was about 0.3 psi after filtration. The adsorption capacity of PEI/PAN/PET membrane and CUNO® filter at pH 9 are shown in FIG. 13. These results show that quaternary amino species could be used to increase the pH tolerance of the PEI/PAN/PET membrane.

Example 27

Figure 14:
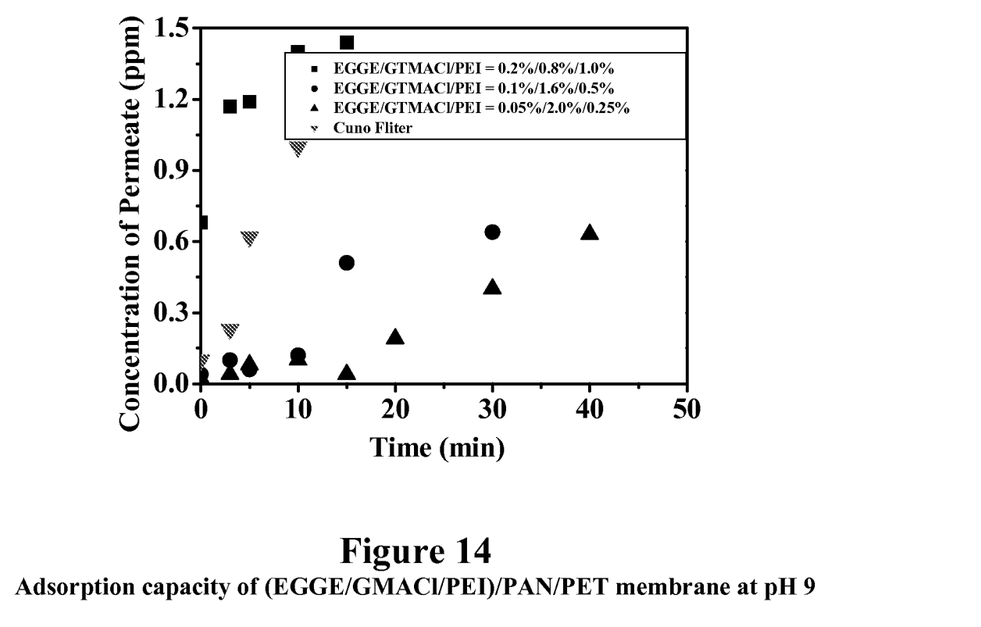
FIG. 14 is a graph showing the adsorption capacity of a (EGdGE/GMACl/PEI)/PAN/PET membrane at a pH of 9.
Figure 15:
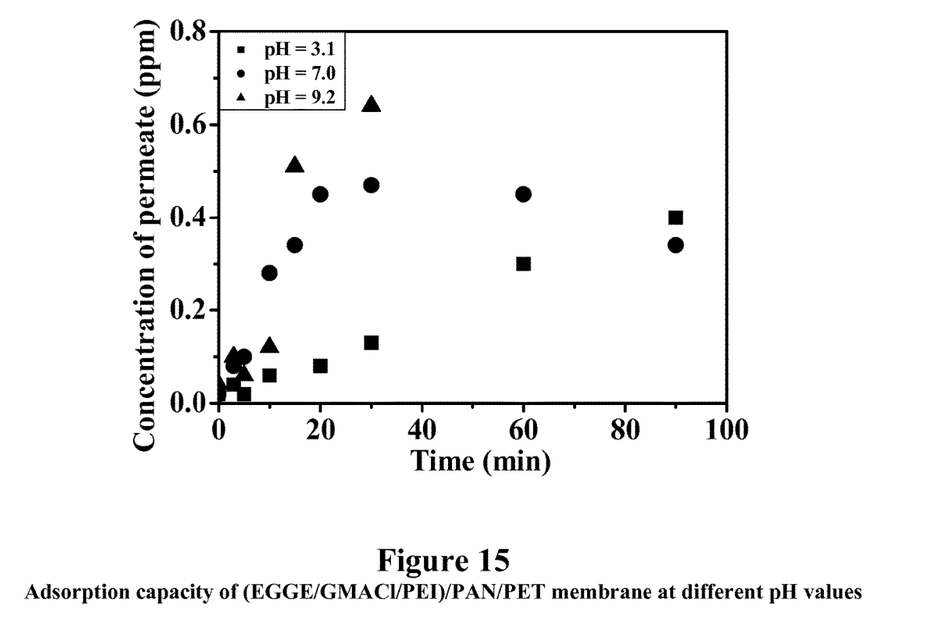
FIG. 15 is a graph showing the adsorption capacity of a (EGdGE/GMACl/PEI)/PAN/PET membrane at different pH values.

The EGGE/GTMACl/PEI membrane discs fabricated with different amounts of the three constituents (EGdGE/GTMACl/PEI=0.2%/0.8%/1.0%, 0.1%/1.6%/0.5%, and 0.05%/2.0%/0.25%, respectively), and with a diameter of 25 mm were washed with Milli-Q water (having 18.2 MO cm$^{-1}$ at 25° C.) for 10 minutes at 3 mL/min. 1.5 ppm Metanil yellow solution at pH=9.1 was used to challenge test the membranes at a flow rate of 3 mL/min. High retention of Metanil yellow dye (pH 9) was achieved in up to 40 minutes when the concentration of GTMACl was increased to above 1.6 wt %, corresponding to 8-times higher than that of the CUNO® MF filter under the same conditions. The pressure drops after test were 2.5, 2.0, and 2.3 psi, respectively. The adsorption capacity of (EGGE/GMACl/PEI)/PAN/PET and the CUNO® MF filter at pH 9 are shown in FIG. 14. The EGGE/GTMACl/PEI membrane was fabricated by coating PAN/PET with a mixture of PEI, glycidyltrimethylammonium chloride (GTMACl), and ethylene glycol diglycidyl ether (EGdGE) with a ratio of EGGE/GTMACl/PEI=0.1 wt %/1.6 wt %/0.5 wt %. Metanil yellow solution (1.5 ppm) at different pH values (3.1, 7.0 and 9.2, respectively) were employed to challenge test the membrane. The adsorption capacity of (EGGE/GMACl/PEI)/PAN/PET membrane for the different pH values is shown in FIG. 15. The membrane had retention of >60% for each of the three pH values (3.1, 7.0 and 9.2) when tested for at least 30 minutes. This indicated that the membrane had a robust adsorption capacity when 50% retention was defined to be the threshold value.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method of forming high flux and low pressure drop microfiltration membranes comprising:
   preparing a nanofibrous structure, wherein the nanofibrous structure comprises an electrospun nanofibrous scaffold comprising polyacrylonitrile (PAN), polyethersulfone (PES)/polyethylene terephthalate (PET) or mixtures thereof; and
   modifying the surface of the nanofibrous structure with a surface modifier, wherein the surface modifier comprises:
   polyethylenimine (PEI)/glycidyltrimethyl-ammonium chloride (GTMACl) cross-linked by glutaraldehyde (GA);
   PEI cross-linked by ethylene glycol diglycidyl ether (EGdGE)/glycidyltrimethyl-ammonium chloride (GTMACl);
   polyvinyl amine cross-linked by GA;
   polyvinyl amine cross-linked by EGdGE/GTMACl; or
   poly(1-(1-vinylimidazolium)ethyl-3-vinylimdazolium dibromide (poly(VEVIMIBr)).

2. The method of claim 1, wherein the nanofibrous structure comprises fibers having diameters of from about 50 nm to about 5 microns.

3. The method of claim 1, wherein the nanofibrous structure comprises fibers having diameters of from about 50 to about 500 nm.

4. The method of claim 1, wherein the surface modifier is produced by in-situ polymerization.

5. The method of claim 1, wherein the surface modifier forms a coating on the surface of the nanofibrous structure, wherein the coating has a thickness of from about 5 to 30 nm.

6. The method of claim 1, wherein the surface modifier forms a coating on the surface of the nanofibrous structure, wherein the coating has a thickness of from about 10 to 20 nm.

7. A method of forming high flux and low pressure drop microfiltration membranes comprising:
   preparing a nanofibrous structure comprising an electrospun nanofibrous scaffold or a glass fiber scaffold or mixtures thereof, wherein the electrospun nanofibrous scaffold comprises polyacrylonitrile (PAN), polyethersulfone (PES))/polyethylene terephthalate (PET) or mixtures thereof; and
   modifying the surface of the nanofibrous structure with a surface modifier, wherein the surface modifier comprises:
   polyethylenimine (PEI)/glycidyltrimethyl-ammonium chloride (GTMACl) cross-linked by glutaraldehyde (GA);
   PEI cross-linked by ethylene glycol diglycidyl ether (EGdGE)/glycidyltrimethyl-ammonium chloride (GTMACl);
   polyvinyl amine cross-linked by GA;
   polyvinyl amine cross-linked by EGdGE/GTMACl; or
   poly(1-(1-vinylimidazolium)ethyl-3-vinylimdazolium dibromide (poly(VEVIMIBr)), wherein the surface modifier is produced by in-situ polymerization.

8. The method of claim 7, wherein the nanofibrous structure comprises nanofibers having diameters of from about 50 nm to about 5 microns.

9. The method of claim 7, wherein the surface modifier forms a coating on the surface of the nanofibrous structure, wherein the coating has a thickness of from about 50 to 500 nm.

10. A microfiltration membrane for water purification, the microfiltration membrane comprising:
    a nanofibrous structure comprising an electrospun nanofibrous scaffold or a glass fiber scaffold or mixtures thereof, wherein the electrospun nanofibrous scaffold comprises polyacrylonitrile (PAN), polyethersulfone (PES))/polyethylene terephthalate (PET) or mixtures thereof; and
    a coating applied to the nanofibrous structure comprising a surface modifier, wherein the surface modifier comprises:
    polyethylenimine (PEI)/glycidyltrimethyl-ammonium chloride (GTMACl) cross-linked by glutaraldehyde (GA);
    PEI cross-linked by ethylene glycol diglycidyl ether (EGdGE)/glycidyltrimethyl-ammonium chloride (GTMACl);
    polyvinyl amine cross-linked by GA;
    polyvinyl amine cross-linked by EGdGE/GTMACl; or
    poly(1-(1-vinylimidazolium)ethyl-3-vinylimdazolium dibromide (poly(VEVIMIBr)), wherein the surface modifier is produced by in-situ polymerization.

11. The microfiltration membrane according to claim 10, wherein the nanofibrous structure comprises nanofibers having diameters of from about 50 to about 5,000 nm.

12. The microfiltration membrane according to claim 10, wherein the surface modifier forms a coating on the surface of the nanofibrous structure, wherein the coating has a thickness of from about 5 to 30 nm.

* * * * *